(12) United States Patent
Fontana et al.

(10) Patent No.: US 8,296,566 B2
(45) Date of Patent: Oct. 23, 2012

(54) METHOD FOR SESSION KEY DERIVATION IN AN IC CARD

(75) Inventors: Giovanni Fontana, Naples (IT); Saverio Donatiello, Meroogliano (IT)

(73) Assignee: Incard S.A., Geneva (CH)

( * ) Notice: Subject to any disclaimer, the term of this patent is extended or adjusted under 35 U.S.C. 154(b) by 1119 days.

(21) Appl. No.: 11/769,908

(22) Filed: Jun. 28, 2007

(65) Prior Publication Data

US 2008/0008322 A1     Jan. 10, 2008

(30) Foreign Application Priority Data

Jun. 29, 2006   (EP) .................................. 06013465

(51) Int. Cl.
*H04L 9/32*     (2006.01)

(52) U.S. Cl. .......... 713/169; 713/155; 713/171; 380/30; 380/277; 380/278

(58) Field of Classification Search .................. 713/155, 713/169, 171; 380/277, 278, 30
See application file for complete search history.

(56) References Cited

U.S. PATENT DOCUMENTS

| | | | | |
|---|---|---|---|---|
| 5,241,599 A | * | 8/1993 | Bellovin et al. ............... | 713/171 |
| 5,796,830 A | * | 8/1998 | Johnson et al. ............... | 380/286 |
| 6,550,008 B1 | * | 4/2003 | Zhang et al. .................. | 713/155 |

OTHER PUBLICATIONS

A. Menezes et al., "Handbook of Applied Cryptography", *CRC Press Series on Discrete Mathematics and ITS Applications*, pp. 497-499; 567-569; 551-552, XP002454821 (1997).

* cited by examiner

*Primary Examiner* — Thanhnga B Truong
(74) *Attorney, Agent, or Firm* — Allen, Dyer, Doppelt, Milbrath & Gilchrist, P.A.

(57) ABSTRACT

A key session derivation is provided during a mutual authentication between a master IC card storing a master key, and a user IC card storing a key-seed. The master IC card and the user IC card are connected through a communication interface for a communication session. A first random number associated to the user IC card is generated. First and second sub keys are derived from the key-seed. First and second session sub keys are respectively derived through the first sub key in combination with the first random number, and through the second sub key in combination with the first random number. The first and second session sub keys are joined in at least a session key for the communication session.

15 Claims, 2 Drawing Sheets

METHOD FOR SESSION KEY DERIVATION IN AN IC CARD

FIELD OF THE INVENTION

The present invention relates to a method for key session derivation during a mutual authentication between a master IC card storing a master key, and a user IC card storing a key-seed, with the master IC card and the user IC card being connected through a communication interface for a communication session. More particularly, there is a mutual authentication between the user IC card and the master IC card so that communications between such IC cards are authorized if they both authenticate each other.

BACKGROUND OF THE INVENTION

A method for IC card session key derivation is involved in an authentication method between a master and a user IC card before starting communications to mutually determine that the master IC card is authorized to read information stored in the user IC card. Similarly, the user IC card is authorized to read information stored in the master IC card before starting the communications.

More particularly, a method for IC cards session key derivation is used during a mutual authentication to determine an authentication between the master and the user IC card interconnected and communicating through an interface terminal. The master IC card comprises at least a first memory unit for storing a first plurality of data, and the user IC card comprises at least a second memory unit for storing a second plurality of data.

Generally, at least a portion of the first and the second plurality of data are secret and require protection. For example, this may be because they comprise sensitive data or information used in secure transactions of a banking application.

In a banking application as schematically shown in FIG. 1, a POS terminal 3 connects a first SAM IC card 1 and a second user IC card 2, for example, respectively through a first slot 3a and a second slot 3b provided by the POS terminal 3 itself. The first SAM IC card 1 comprises at least a first memory unit 1a for storing a first plurality of data, and the second user IC card 2 comprises at least a second memory unit 2a for storing a second plurality of data.

The authentication between the SAM IC card 1 and the user IC card 2 is generally implemented through a mutual authentication that is briefly described below. The first memory unit 1a inside the SAM IC card 1 holds a Master Key 1M and a Function 1F. The Function 1F is used to derive an additional Key, relating to a user IC card 2 inserted in the second slot 3b of the POS terminal 3.

More particularly, such an additional key, hereinafter indicated as Child Unique Keys 1K, is used to implement the mutual authentication between the SAM IC card 1 and the user IC card 2. The mutual authentication provides that an IC card identification number, for example an IC card serial number 2sn generally stored inside the second memory unit 2a of a user IC card 2, is transmitted to the SAM IC card 1.

The Function 1F processes through the Master key 1M and the IC card serial number 2sn, a Child Unique Key 1K to be used to authenticate a corresponding user IC card 2.

The SAM IC card 1 also generates a Random number 1rand, stores it in the first memory unit 1a and sends it to the user IC card 2. The user IC card 2 reads the Random number 1rand through the POS terminal 3, encrypts it and sends it back to the SAM IC card 1 as an encrypted random number 2enc-rand.

The SAM IC card 1 may decrypt the encrypted Random number 2enc-rand through the Child Unique Key 1K corresponding to the user IC card 2 inserted in the second slot 3b, and previously stored inside the first memory unit 1a. The result of such a decryption is compared to the Random number 1rand stored inside the first memory unit 1a of the SAM IC card 1.

If the result of the decryption is equal to the Random number 1rand previously stored, the SAM IC card 1 authenticates the user IC card 2. Otherwise, the SAM IC card 1 rejects the user IC card 2. More particularly, if the SAM IC card 1 authenticates the user IC card 2, a reverse authentication called from the user IC card 2 and intended to authenticate the SAM IC card 1 is performed. The reverse authentication substantially comprises all the computations described above to authenticate the user IC card 2.

As described above, the mutual authentication comprises a large amount of communications between the SAM IC card 1 and the user IC card 2. In particular, each communication is intended to send an initialization message of the mutual authentication between the two IC cards 1, 2; an IC card serial number 2sn from the user IC 2 to the SAM IC card 1; a random number 1rand from the SAM IC card 1 to the user IC card 2; an encrypted Random number 2enc-rand from the user IC card 2 to the SAM IC card 1; and an acknowledge or a non-acknowledge message from the SAM IC card 1 to the user IC card 2 respectively intended to start or to refuse the following communication between the two IC cards.

Moreover, when the authentication from the SAM IC card 1 to the user IC card 2 is completed, a mutual authentication from the user IC card 2 to the SAM IC card 1 comprising a corresponding plurality of communications is to be performed. When a communication between the SAM 1 and a user IC card 2 is terminated, a new communication between another user IC card 2 and the SAM IC card 1 may start. The Function 1F processes another Child Unique Key 1K through the Master key 1M and through another IC card serial number 2sn stored inside the user IC card 2, and an authentication is processed.

A considerable number of interactions between the SAM 1 and the user IC card 2 makes the authentication time consuming, thus reducing the throughput of the POS terminal 3 and limiting the number of services rendered to the corresponding user IC card 2. At the same time, with more communications between the SAM 1 and the user IC card 2, the mutual authentication become more dangerous. Each communications is exposed to a potential external attack intended to intercept data. Also, increasing the number of single operations involved in the mutual authentication becomes expensive, and the time required by the global mutual authentication increases.

In other words, the authentication between a master IC card 1 and a user IC card 2 exposes the secure data stored inside the corresponding memory units to potential risks due to the time required to complete the mutual authentication. In particular, this is to the time required by the single operations involved in such a mutual authentication, as well as to the number of interchanges required by the authentication itself for reducing the throughput of the terminal that sequentially interconnects a plurality of user IC cards with the same master IC card.

SUMMARY OF THE INVENTION

In view of the foregoing background, an object of the present invention is to provide a method for session key derivation in an IC card that is able to reduce the time required by a mutual authentication with a corresponding master IC card. At least the same level of security provided by the prior art method for executing non-time consuming and non-computational intensive operations may be provided while overcoming the above-mentioned drawbacks of the prior art method.

This and other objects, advantages and features in accordance with the present invention are provided by a method for key session derivation in a mutual authentication between a master IC card and a user IC card, wherein the method comprises processing a master key stored in the master IC card, and a key-seed associated to the user IC card to derive a session key with non-expensive computational operations. This may be supported by common hardware included in such IC cards.

More particularly, the method may comprise generating at least a first random number associated to the user IC card, deriving at least first and second sub keys from the key-seed, deriving at least a first and a second session sub keys, respectively through the first sub key in combination with the first random number and through the second sub key in combination with the first random number. The method may further comprise joining the at least first and second session sub keys in at least a session key for the communication session.

BRIEF DESCRIPTION OF THE DRAWINGS

Further characteristics and advantages of the method for deriving a session key according to the present invention will be apparent from the following description of an embodiment thereof, made with reference to the annexed drawings, given for illustrative and non-limiting purposes.

DETAILED DESCRIPTION OF THE PREFERRED EMBODIMENTS

Figure 1:
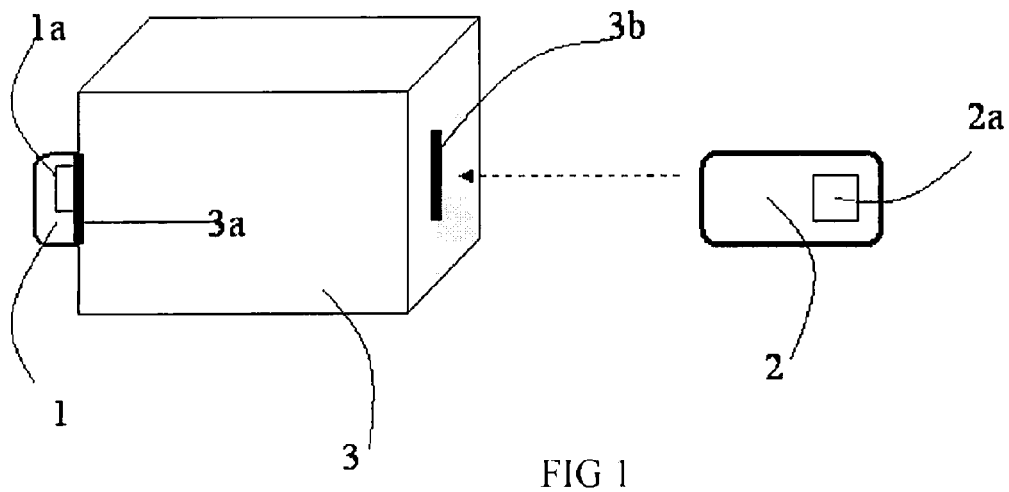
FIG. 1 schematically shows a POS terminal interconnecting a user IC card with a SAM IC card according to the prior art.
Figure 2:
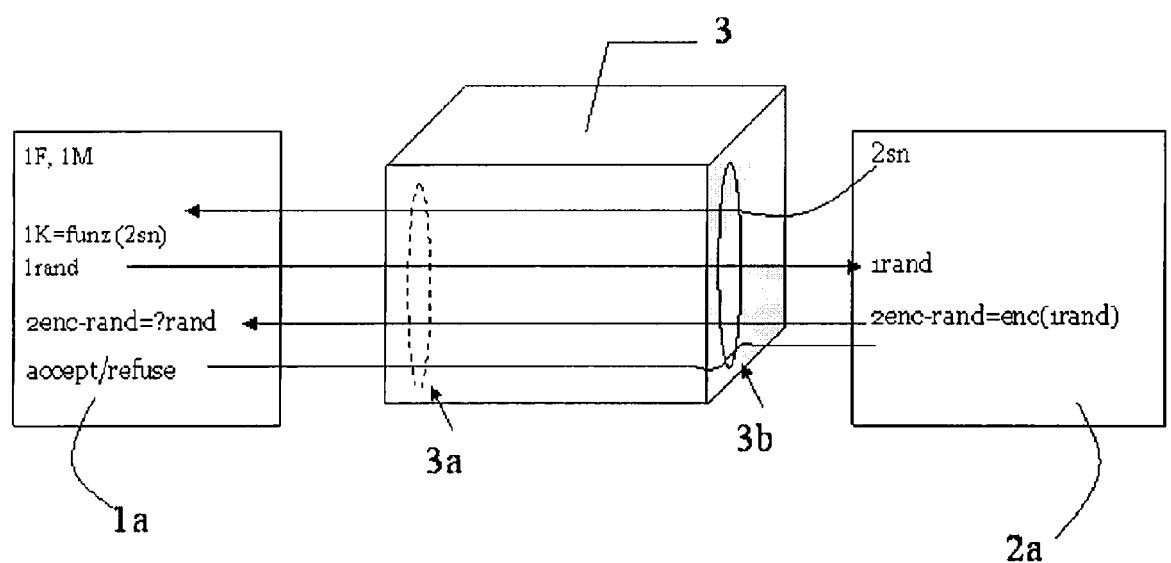
FIG. 2 schematically shows a sequence of steps representing operations to be processed during a mutual authentication between a user IC card and a SAM IC card according to the prior art.
Figure 3:
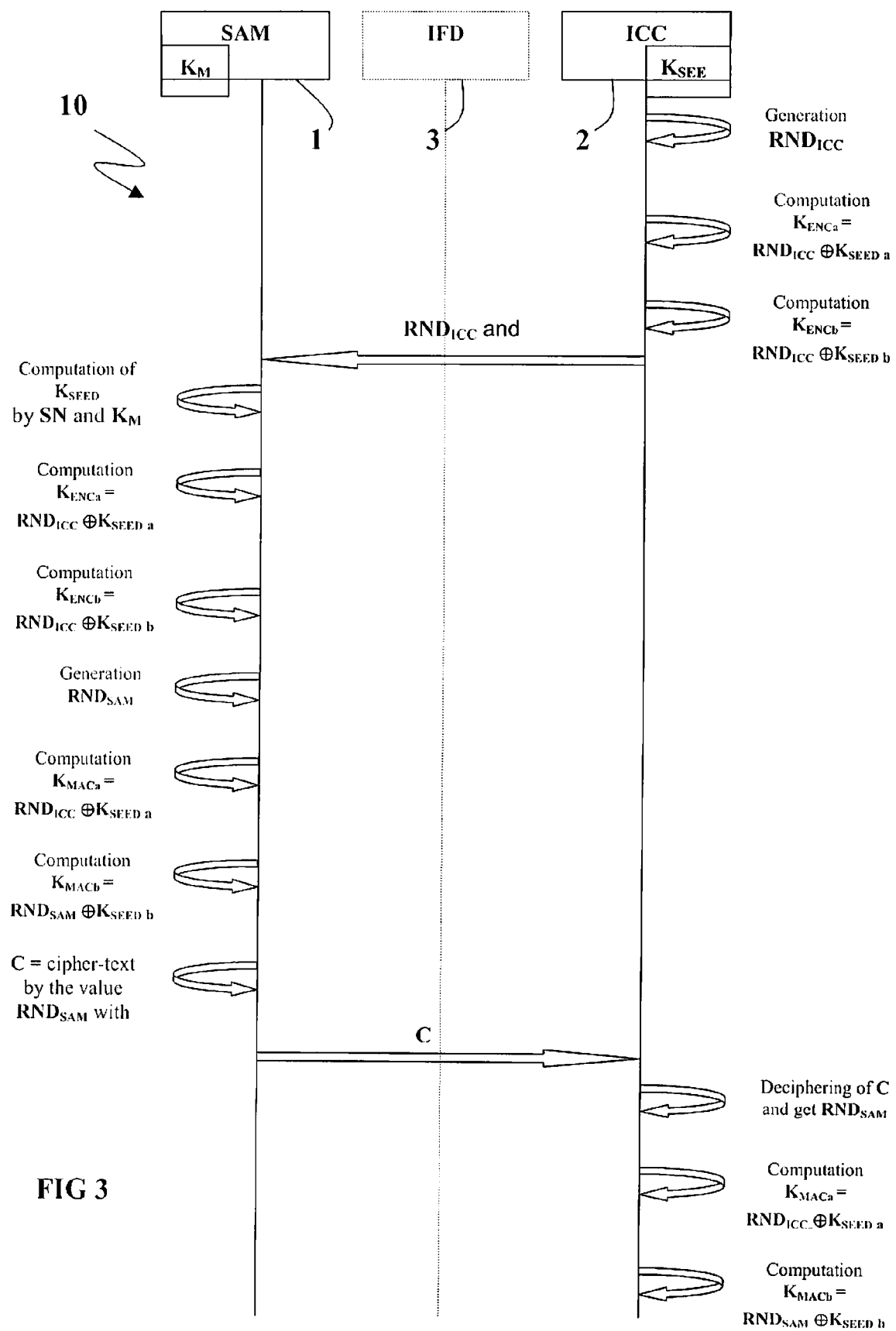
FIG. 3 schematically shows a sequence of computations involved in a session key derivation during a mutual authentication according to the present invention.

With specific reference to FIG. 3, a sequence of computations and communications between a SAM IC card 1 and a user IC card 2 involved in a mutual authentication are schematically represented and globally indicated with numeral reference 10. More particularly, the SAM IC card 1 and the user IC card 2 are interconnected through an interface IFD 3, included in a terminal, for a communication session to exchange data, for example.

A method for a session key derivation is involved in the mutual authentication between the SAM IC card 1 and the user IC card 2 to derive a couple of keys, depending from the current communication session, to protect sensitive data flow exchanged between SAM IC card 1 and user card 2.

The method for session key derivation provides data input to derive session keys corresponding to the communication session. More particularly, the data input comprises a key-seed stored inside the user IC card 2, hereinafter also indicated as $K_{SEED}$. $K_{SEED}$ may be 16-bytes long key, for example.

Each user IC card 2 stores a different key-seed $K_{SEED}$. A value for key-seed depends on a Key Master $K_M$ loaded inside the SAM IC card 1 and on a serial number ICC.SN associated to the user IC card 2. A value for $K_{SEED}$ is computed through an elaboration of the serial number ICC.SN and $K_M$. More particularly, the key $K_{SEED}$ is computed and then stored in the user card 2 at Personalization time, and is computed by the SAM IC card 1 during a mutual authentication to derive a session key for the communication session.

The data input according to the method also comprises a couple of random numbers $RND_{ICC}$ and $RND_{SAM}$ respectively generated by the user IC card 2 and by the SAM IC card 1. $RND_{ICC}$ and $RND_{SAM}$ may, for example, be two 8-bytes long random numbers generated and exchanged during a mutual authentication so as to mutually authenticate the user IC card 2 and the SAM IC card 1.

More particularly, the method for key session derivation comprises the following phases. The key-seed $K_{SEED}$ is split in two keys $K_{SEEDa}$ and $K_{SEEDb}$. For example, each of $K_{SEEDa}$ and $K_{SEEDb}$ may be 8-bytes long. More generally, given a generic key $K_{XXX}$ and $K_{XXXa}$ indicates the most significant 8-bytes of $K_{XXX}$ and $K_{XXXb}$, i.e., its last significant 8-bytes. The method further comprises deriving a couple of keys, $K_{ENCa}$ and $K_{ENCb}$ for example, through an XOR operation respectively between $K_{SEEDa}$ and $RND_{ICC}$ and between $K_{SEEDb}$ and $RND_{ICC}$, and deriving a couple of keys, $K_{MACa}$ and $K_{MACb}$ for example, through an XOR operation respectively between $K_{SEEDa}$ and $RND_{ICC}$ and between $K_{SEEDb}$ and $RND_{SAM}$. An XOR operation will also be referred to below with the symbol $\oplus$.

The keys $K_{ENC}$ and $K_{MAC}$, also indicated as session keys, are used to encipher a given data and to perform the mutual authentication on the given data. Both $K_{ENC}$ and $K_{MAC}$ may be considered 16-bytes long keys. More particularly, $K_{SEED}$, which is composed of two sub parts $K_{SEEDa}$ and $K_{SEEDb}$, is used to derive respectively:

$$K_{ENCa} = RND_{ICC} \oplus K_{SEEDa}, \text{ and}$$

$$K_{ENCb} = RND_{ICC} \oplus K_{SEEDb}$$

$K_{ENCa}$ is obtained by an XOR operation between $RND_{ICC}$ and $K_{SEEDa}$, and $K_{ENCb}$ is obtained by a corresponding XOR operation between $RND_{ICC} \oplus K_{SEEDb}$. The parity bits in $K_{ENCa}$ and $K_{ENCb}$ are adjusted and $K_{ENC}$ is calculated by the concatenation of $K_{ENCa}$ and $K_{ENCb}$, obtaining $K_{ENC} = K_{ENCa} \| K_{ENCb}$.

In a similar way, $K_{MACa}$ and $K_{MACb}$ are calculated:

$$K_{MACa} = RND_{ICC} \oplus K_{SEEDa}, \text{ and}$$

$$K_{MACa} = RND_{SAM} \oplus K_{SEEDb}$$

Also, the parity bits in $K_{MACa}$ and $K_{MACa}$ are adjusted to calculate $K_{MAC} = K_{MACa} \| K_{MACa}$, as previously described with reference to $K_{ENC}$.

Advantageously, the method for session key derivation derives through a few steps of computation, based on non-expensive and simple operations, the session secret keys for mutual authentication between the SAM IC card 1 and the user card 2, without a lack of security. This is even when the user card 2 and/or the SAM IC card 1 are not provided with special hardware to support computation intensive operations.

Advantageously, few computational steps are performed to derive the session keys. These steps are not based on computational intensive operations such as XOR operations, which assure the requirement of efficiency. The method for session key derivation is based on a secret key-seed $K_{SEED}$ stored in a user IC card that is unknown externally the user IC card for assuring a security requirement.

Advantageously, the method for deriving session keys provides the session keys $K_{ENC}$ to a user card 2 involved in communications with a SAM IC card 1 not only decreases the time required to derive such session keys with a few steps of computations, but also derives through the same few steps of computation a session key $K_{MAC}$ for the SAM IC card 1.

That which is claimed:

1. A method for key session derivation during a mutual authentication between a master integrated circuit (IC) card storing a master key and a user IC card storing a key-seed, the master IC card and the user IC card are connected through a communication interface for a communication session, the method comprising:
   generating at least one first random number associated with the user IC card;
   deriving at least one first and second sub keys by splitting the key-seed;
   deriving at least one first and second session sub keys, respectively, based on the at least one first sub key in combination with the at least one first random number and based on the at least one second sub key in combination with the at least one first random number; and
   joining the at least one first and second session sub keys for deriving at least one first session key for the communication session.

2. A method according to claim 1 wherein generating the at least one first random number comprises generating at least one second random number associated with the master IC card.

3. A method according to claim 2 wherein deriving the at least one first and second sub keys comprises deriving at least one third and fourth session sub keys obtained respectively through the at least one first sub key in combination with the at least one second random number and through the at least one second sub key in combination with the at least one second random number.

4. A method according to claim 3 wherein joining the at least one first and second session sub keys comprises processing the at least one third and fourth session sub keys for deriving at least one corresponding second session key for the communication session.

5. A method according to claim 4 wherein deriving the at least one first, second, third and fourth session sub keys comprises an XOR operation between the at least one first and second sub keys and the at least one first and second random numbers.

6. A method for key session derivation during a mutual authentication between a master integrated circuit (IC) card and a user IC card, the method comprising:
   storing a key-seed in the user IC card, and storing a master key in the master IC card;
   coupling the user IC card to the master IC card via a communication interface for a communication session;
   generating at least one first random number associated with the user IC card;
   deriving at least one first and second sub keys by splitting the key-seed;
   deriving at least one first and second session sub keys, respectively, based on the at least one first sub key in combination with the at least one first random number and based on the at least one second sub key in combination with the at least one first random number; and
   joining the at least one first and second session sub keys for deriving at least one first session key for the communication session.

7. A method according to claim 6 wherein generating the at least one first random number comprises generating at least one second random number associated with the master IC card.

8. A method according to claim 7 wherein deriving the at least one first and second sub keys comprises deriving at least one third and fourth session sub keys obtained respectively through the at least one first sub key in combination with the at least one second random number and through the at least one second sub key in combination with the at least one second random number.

9. A method according to claim 8 wherein joining the at least one first and second session sub keys comprises processing the at least one third and fourth session sub keys for deriving at least one corresponding second session key for the communication session.

10. A method according to claim 9 wherein deriving the at least one first, second, third and fourth session sub keys comprises an XOR operation between the at least one first and second sub keys and the at least one first and second random numbers.

11. An integrated circuit (IC) card comprising:
    a memory for storing a key-seed to be used in a communication session over a communications interface with a master IC card;
    an interface for interfacing with the master IC card via the communications interface; and
    a processor coupled to said memory and to said interface for performing a key session derivation during a mutual authentication with the master IC card storing a master key and said memory storing the key-seed, the performing comprising
       generating at least one first random number associated with the user IC card,
       deriving at least one first and second sub keys by splitting the key-seed,
       deriving at least one first and second session sub keys, respectively, based on the at least one first sub key in combination with the at least one first random number and based on the at least one second sub key in combination with the at least one first random number, and
       joining the at least one first and second session sub keys for deriving at least one first session key for the communication session.

12. An IC card according to claim 11 wherein generating the at least one first random number comprises generating at least one second random number associated with the master IC card.

13. An IC card according to claim 12 wherein deriving the at least one first and second sub keys comprises deriving at least one third and fourth session sub keys obtained respectively through the at least one first sub key in combination with the at least one second random number and through the at least one second sub key in combination with the at least one second random number.

14. An IC card according to claim 13 wherein joining the at least one first and second session sub keys comprises processing the at least one third and fourth session sub keys for deriving at least one corresponding second session key for the communication session.

15. An IC card according to claim 14 wherein deriving the at least one first, second, third and fourth session sub keys comprises an XOR operation between the at least one first and second sub keys and the at least one first and second random numbers.

* * * * *